Nov. 11, 1924.       G. B. KISSINGER       1,515,216
CONSTRUCTION FASTENER
Filed Dec. 14, 1922       2 Sheets-Sheet 1
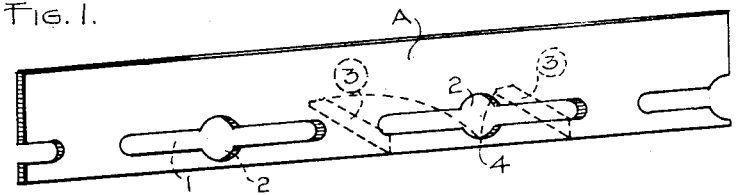
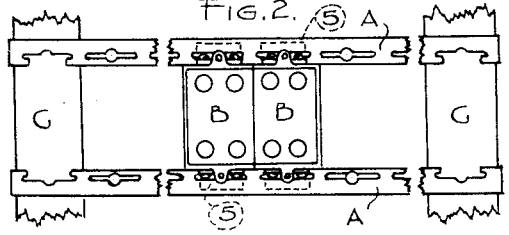
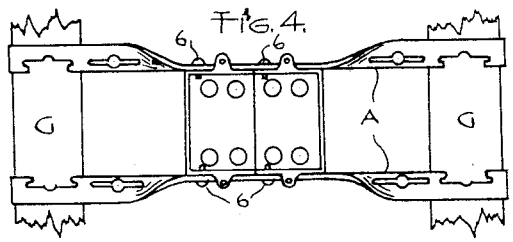
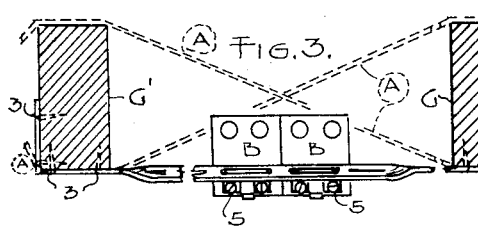
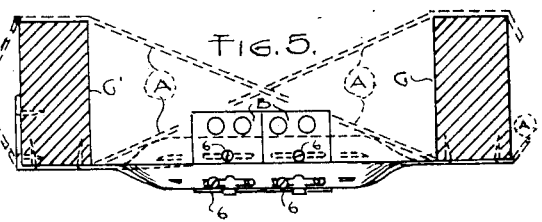
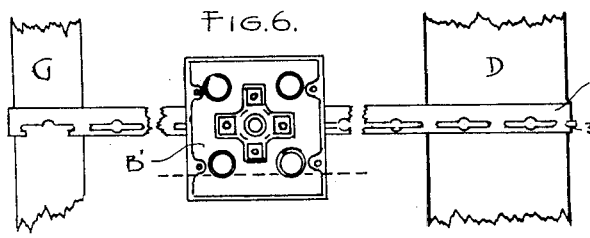
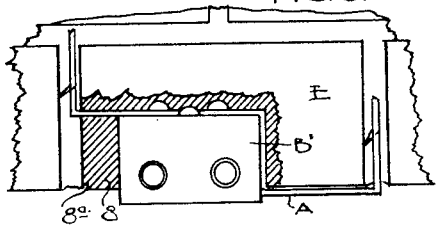
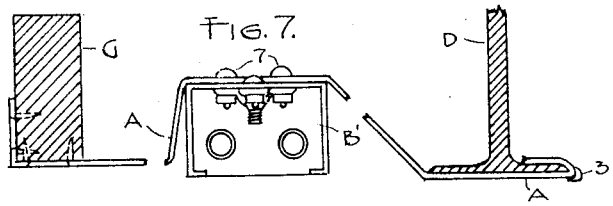
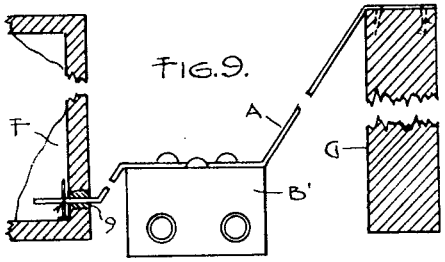
INVENTOR.
George B Kissinger,
BY Edward A. Lawrence,
his ATTORNEY.

Nov. 11, 1924.  
G. B. KISSINGER  
1,515,216  
CONSTRUCTION FASTENER  
Filed Dec. 14, 1922  
2 Sheets-Sheet 2
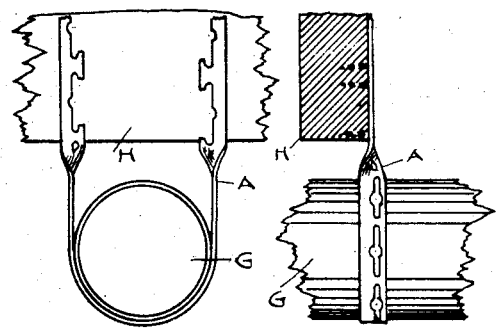
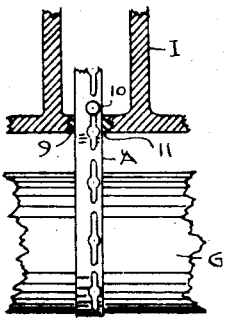
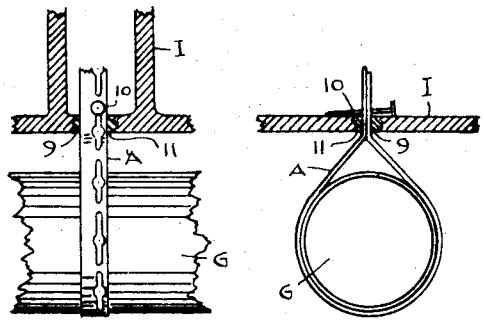
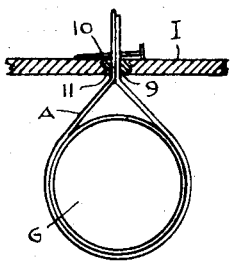
FIG.10.   FIG.11.   FIG.12.   FIG.13.
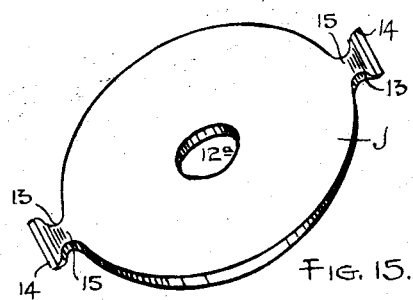
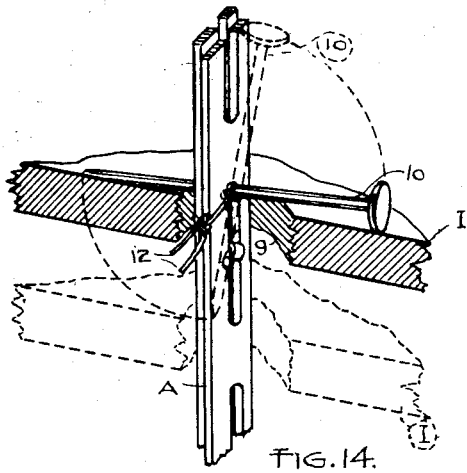
FIG.15.   FIG.14.
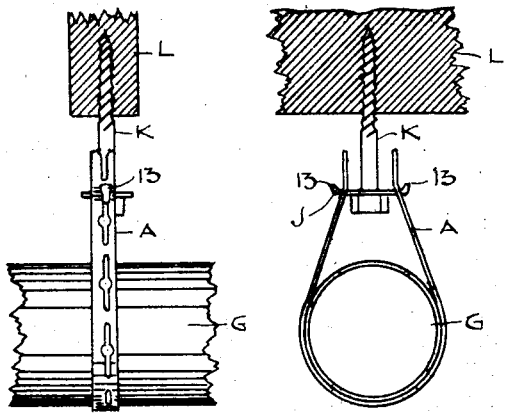
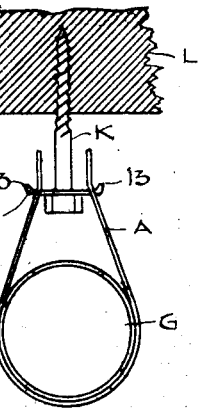
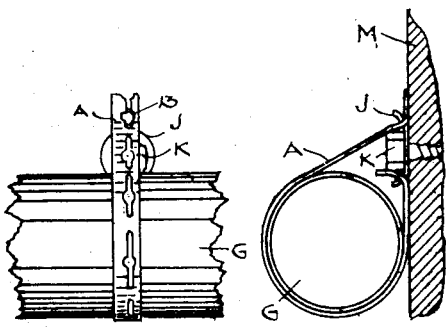
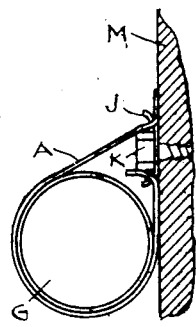
FIG.16.   FIG.17.   FIG.18.   FIG.19.
INVENTOR.
George B. Kissinger
BY Edward A. Laurence,
his ATTORNEY.

Patented Nov. 11, 1924.

1,515,216

UNITED STATES PATENT OFFICE.

GEORGE B. KISSINGER, OF ASPINWALL BOROUGH, PENNSYLVANIA.

CONSTRUCTION FASTENER.

Application filed December 14, 1922. Serial No. 606,846.

*To all whom it may concern:*

Be it known that I, GEORGE B. KISSINGER, a citizen of the United States, and residing in the borough of Aspinwall, in the county of Allegheny and State of Pennsylvania, have invented or discovered the new, useful, and Improved Construction Fasteners, of which the following is a specification.

My invention consists in a new and improved utility member for building construction work.

The primary object which I have in view is the provision of an inexpensive, simple, easily erected and efficient device for securing in place boxes and other fixtures and inclosures, such as are used in buildings, shafts, runways and other structures, as housings for electric wiring and the like.

Another object is the provision of improved means for supporting and hanging in place conduits and pipes used for carrying or inclosing electric wires and cables, or used for water, gas or steam, and which means may also be used as a tie-strap for general building construction.

Another object which I have in veiw is the provision of a device of this general character which may be used for general building purposes, such as bridging for joist and rafters, as a tie strap for veneer walls, and for many other like purposes.

Generally speaking, my new and improved fastener consists of a flat metal strip provided with longitudinally disposed slots. Such slots are preferably positioned nearer one of the lateral edges of the fastener than to the opposite edge thereof, so that the narrower walls of the slots may be cut through and the severed end or ends bent at an angle to form integral nailing prongs for attaching the fastener to a support without the use of nails or screws. The slots are provided with lateral enlargements which serve the double purpose of weakening the narrower wall of the slots and thus facilitating the formation of the prongs, and also to provide clearance for the head of screws, bolts, nails and other attaching members.

My invention also consists in new and useful means for securing the ends of a fastener, looped about a pipe or other object to be supported, in an opening in a floor, hollow tile or other construction element.

My invention further consists in a new and useful washer element, for use with a lag screw, bolt or spike, to secure my fastener when looped about a pipe, conduit or other object to be supported.

In the accompanying drawings, wherein the preferred embodiment of my invention is illustrated, and wherein also a number of methods of applying my fastener to practical use are also illustrated, Fig. 1 is a broken perspective of the preferred form of my improved fastener; Fig. 2 is a front elevation showing a pair of switch boxes supported by a pair of my fasteners between adjacent studding; Fig. 3 is a top plan view of the same, the studding being shown in section; Fig. 4 is a view similar to Fig. 2, showing another method of securing the switch boxes to the fasteners, and Fig. 5 is a plan view of the same with the studding shown in section; Fig. 6 is a front view or bottom plan view of an outlet box or cabinet mounted by means of one of my fasteners between adjacent studding or ceiling joist; Fig. 7 is a view taken at right angles to Fig. 6, the studding or joist being shown in section; Fig. 8 is a view partially in plan and partially in horizontal section showing my fastener used to mount an outlet box in a tile or brick wall; Fig. 9 is a sectional view showing an outlet box supported by one of my fasteners which is attached to the top of a joist or beam while the other end of the fastener is secured in a hole in a hollow tile forming an adjacent part of the building; Fig. 10 is an elevation showing my fastener used to hang a pipe from a joist or beam; Fig. 11 is a view taken at right angles to Fig. 10, the joist being shown in section; Figs. 12 and 13 are views similar to Figs. 10 and 11, showing my fastener used for hanging a pipe beneath a hollow tile or concrete floor; Fig. 14 is a view showing the method of attaching the fastener to a hollow tile or concrete floor or wall; Fig. 15 is an enlarged perspective showing the form of washer which I use to connect my fastener to lag screws and the like; Fig. 16 is a side elevation showing the use of such washer for suspending a pipe from a joist or beam, the latter being shown in section; Fig. 17 is a view taken at right angles to Fig. 16; Fig. 18 is a side elevation showing the use of said washer in hanging a pipe with my fastener to a vertical wall, and Fig. 19 is a view at right angles to Fig. 18, the wall being shown in section. Figs. 3 and 5 also show the use of my fastener as a bridging element.

The following is a detailed description of the drawings, reference being first had to Fig. 1.

A is the fastener, formed of a strip of flat metal, such as by stamping the same from a sheet of metal of sufficient thickness to give the necessary strength and having sufficient ductility to permit bending without rupture. The metal is preferably galvanized or otherwise protected against rust and corrosion.

The fastener A is preferably supplied in standard length of say, twenty to thirty feet, and it is readily cut into shorter lengths on the job as necessary or convenient.

The fastener is provided with a series of longitudinally alined and disposed slotted openings 1, the same being preferably closer to the one side edge of the fastener than to the opposite edge thereof.

The slots 1 are provided with lateral enlargements 2, preferably intermediate of the ends of the slots, said enlargements serving a two-fold purpose. Thus, such enlargements permit the introduction through the fastener of the head of a screw, bolt, nail or other attaching member, which head is of too large diameter to pass through the slot. Thus the head of the attaching member may be introduced through the enlargement 2 and then the attaching member may be shifted along the slot, thus preventing the head from passing back through the slot and holding the attaching member in engagement with the fastener A. Again the narrower wall of the slot is weakened by the enlargement 2, thus enabling it to be easily severed or cut through forming nailing prongs 3 which are bent back at right angles to the plane of the fastener A, as shown in dotted lines at 3, the cut being indicated by the dotted line 4.

In Figs. 2 and 3 I have illustrated two of my fasteners A used to mount a pair of switch boxes B between the spaced apart studding or posts C and C'. Thus near one end of the fastener the walls of the slots 1 are cut through at the enlargements, and the prongs 3, thus formed are bent back and the end of the fastener is then bent around the studding C and the prongs driven into the studding. The two fasteners are thus attached at one end to the studding C, vertically spaced apart at the right distance to the wall. The boxes B are then mounted on the fasteners by inserting their wall lugs 5 from the front through the properly positioned slots 1 of the fasteners. The free ends of the fasteners A are then stretched horizontally across the other studding C', their necessary length measured and the excess length cut off. The walls of the two end slots 1 are then cut through the enlargements 2 to form the prongs 3 and the same are bent back. The fastener is then bent around the studding and the prongs driven into the wood.

It is evident that the boxes may be very quickly mounted in place in this manner, by the use of my fasteners, and are mounted in a substantial and permanent manner. The ductility of the fasteners permits them to be twisted sufficiently from the vertical plane, as shown in Fig. 3 to provide clearance for the insertion of the wall lugs 5 through the slots 1.

In Figs. 4 and 5 I show the switch boxes B secured to the fasteners A by removing the wall lugs and using the headed screw bolts 6, by which in standard practice the wall lugs are secured to the wall boxes, for engagement with the slots of the fasteners. In such case I first attach the fasteners A to the studding C by driving into the latter the prongs 3 as above described, and then with a pair of pliers twist the fasteners A adjacent to the studding C, ninety degrees, so that they are disposed in horizontal planes. I then insert the heads of the screw bolts 6 through the enlargements 2 of the properly positioned slots 1, and then shift the boxes so that the heads of said screw bolts are moved into the slots proper which are too narrow to permit the disengagement of the screw heads from the fasteners. The screw bolts are then tightened, locking the boxes fast to the fasteners. The pliers are then used to twist the fasteners A on the other side of the boxes, ninety degrees, back into the vertical, and the free ends are then secured to the studding C', as already described. In Fig. 4 and in solid lines in Fig. 5 I have shown the intermediate portion of the fasteners twisted forwardly into the horizontal, but if it be desired to place a box of another type or to set back farther, the fasteners may be twisted rearwardly, as shown in dotted lines in Fig. 5.

In Figs. 6 and 7 I show the large outlet box B' mounted between the studding or joist C and the I-beam or post D. In this case the one end of the fastener A is clamped about the lower or outer flange of the I-beam or post, the prong 3 being upset and hammered down to tighten the grip on the beam or post. The other end of the fastener is secured to the studding or joist C in the manner already described. The intermediate portion of the fastener A may be bent inwardly or upwardly, to provide sufficient clearance to bring the front of the box B' flush with the surface of the wall or ceiling. The box is secured to the fastener by the extension of its headed bolts 7 through the slots 1 of the fastener A. These bolts may be inserted through said slots when applied to the box before the fastener is mounted in place, or the fastener A may be first erected and the enlargements 2 of the slots in the fasteners may then be used for introducing the heads of the bolts 7 through the fasteners, the box being then shifted laterally into its proper position with the shanks of the bolts engaging the narrow slots 1, through which slots the heads of the bolts cannot pass. Thus the box is securely held in place on the fastener but it may be shifted thereon to properly locate the box. In Fig. 8 I show the box B' held in a recess 8 in a tile or brick wall E, the box being attached to the fastener A, as last described, and the fastener being bent to extend between the bricks and to be held in position by the mortar, the prongs 3 acting as anchoring projections. The filling 8ª is placed after the box is erected.

In Fig. 9 I show the box B' mounted on the fastener A as in the three preceding figures of the drawings, one end of the fastener being attached by its prongs 3 to the rear edge of the studding C, or where the box is a ceiling box, the element C may represent a joist or beam. The other end of the fastener is inserted in a hole 9 in the wall of the hollow tile F which forms a part of the building ceiling or wall, a nail 10 being inserted through a slot 1 in the inserted end of the fastener A to prevent withdrawal of the fastener. The method of thus securing an inserted end of the fastener will be more fully explained in connection with Fig. 14 of the drawings. In the case of ceiling outlet boxes, the attachment of the fastener to the upper face of the joist forms a firm and permanent anchorage for the box.

In Figs. 10 and 11 I show my fastener bent to form a hanger loop for the pipe or conduit G, the ends of the fastener being attached to the beam or joist H by means of their prongs 3. In Figs. 12 and 13, I show the pipe or conduit G supported by a looped fastener whose ends are inserted up through a hole 9 in the ceiling or floor tile I, and held against slipping out by the nail 10, the hole being afterwards plugged with mortar or cement 11.

In Fig. 14 I show the method of inserting the ends of the fastener into the hole 9 in the tile I. In such case the two ends of the fastener are placed side by side and the nail 10 is tied to one of the fasteners by the core or wire 12. The nail is now turned up into the position shown in dotted lines in Fig. 14 with its lower, unheaded end extending into registering slots 1 in the two ends of the fastener, the cord securing the nail considerably below its center of gravity. The said ends and the nail, the latter head first, are then inserted up through the hole 9, which is made large enough to permit easy insertion, until the unheaded end of the nail is above the lower wall of the tile as indicated in dotted lines. The nail now, being overbalanced above the cord, drops, as shown in dotted lines, and the fastener and its burden are then lowered until the nail assumes the horizontal position shown in dotted lines straddling the hole 9 and thus preventing the further drop of the fastener.

In Fig. 15 I show an enlarged view of a washer J which I may use in connection with a lag screw K, or a rail or bolt for sustaining a looped fastener A which is supporting the conduit G.

The washer is provided with a central bore 12ª through which the lag screw, spike or bolt is passed before being driven into the ceiling L, as in Figs. 16 and 17, or into the vertical wall M, as in Fig. 19. The perimeter of the washer is provided with slightly hooked or bent ears 13 having enlarged ends 14 and reduced necks 15. Said enlarged ends are inserted through the enlargements 2 of the slots 1 of the fasteners and then the ends of the fasteners are shifted so that reduced necks 15 are engaged by the narrow slots 1 through which the enlarged necks 14 cannot pass.

In Figs. 3 and 5 I have shown in dotted lines the fasteners A which are used for bridging between the joist, as a cheaper and improved substitute for wooden bridging. In such cases, if desired, the prongs 3 may be used to attach the fasteners to the top and bottom edges of the joist, but nails are preferable in such cases.

It is evident that a conduit may be first suspended at a conveniently low elevation by a plurality of said looped fasteners A spaced at convenient distances apart, and may then be elevated by raising the pipe and shortening the loops of the fasteners one at a time. The loops of the fasteners may be conveniently shortened by disengaging one end of the fastener from the washer and re-hooking a lower slot on the washer.

The foregoing are but a few of the many ways in which my fastener may be used in construction work, many other of such functions being evident to one skilled in any of the building trades.

Thus, for instance, it is evident that my fastener may be used for general tying purposes in construction work, such as tying a brick veneer wall to a frame backing or tying parallel courses of brick or tile together.

What I desire to claim is:—

1. A fastener for mounting electric switch boxes comprising a strip of easily flexed sheet metal adapted to be cut into suitable lengths and secured at the ends to studding of a buiding, the intermediate portion of the strip being twisted to an angular position relative to the end portions of said strip, said strip being provided with a plurality of longitudinal openings arranged at regularly spaced intervals, said openings being provided with an intermediate enlarged portion for the reception of fastening means on an electric switch box and the longitudinal openings permitting movement of the switch box to adjust the same on the twisted portion of the strip after said fastening means has been inserted through the enlarged portion.

2. A fastener of the class described comprising a strip of easily flexed sheet metal adapted to be cut into suitable lengths, said strip being provided with a plurality of longitudinal openings arranged at regularly spaced intervals nearer one lateral edge thereof than the other to form a relatively narrow side wall for said openings, each of said openings having an intermediate enlarged portion, the narrow side wall of said openings at the enlarged portion on the ends of the fastener being cut across and bent outwardly to form nailing prongs to be driven into studding of a building for attaching the fastener and support an electric switch box having fastening means sildably engaging in the openings.

3. A fastener of the class described comprising a strip of easily flexed sheet metal adapted to be cut into suitable lengths and secured at the ends to studding of a building, said strip being provided with a plurality of regularly spaced longitudinal openings, each of said openings having an enlarged portion, said openings being nearer one lateral edge of the strip than the other, said enlarged portion adapted to receive fastening means on an electric switch box, and the longitudinal openings permitting slidable movement therein of the fastening means to adjustably support the switch box.

Signed at Pittsburgh, Pa., this 11th day of December, 1922.

GEORGE B. KISSINGER.